United States Patent
Kim et al.

(10) Patent No.: US 10,522,803 B2
(45) Date of Patent: Dec. 31, 2019

(54) BATTERY PACK INCLUDING COUPLING MEMBER HAVING ASSEMBLING GUIDE FUNCTION

(71) Applicant: LG Chem, Ltd., Seoul (KR)

(72) Inventors: Gwan Woo Kim, Daejeon (KR); Sang Wook Yim, Daejeon (KR); Hyo Chan Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 233 days.

(21) Appl. No.: 15/789,040

(22) Filed: Oct. 20, 2017

(65) Prior Publication Data

US 2018/0114961 A1 Apr. 26, 2018

(30) Foreign Application Priority Data

Oct. 21, 2016 (KR) .................. 10-2016-0137723

(51) Int. Cl.
*H01M 2/10* (2006.01)
*H01M 10/613* (2014.01)
(Continued)

(52) U.S. Cl.
CPC ....... *H01M 2/1077* (2013.01); *H01M 10/613* (2015.04); *H01M 10/647* (2015.04); *H01M 10/6554* (2015.04); *H01M 10/6556* (2015.04); *H01M 2/206* (2013.01); *H01M 2220/20* (2013.01)

(58) Field of Classification Search
CPC .......... H01M 10/613; H01M 10/6554; H01M 10/6556; H01M 2/1077
See application file for complete search history.

(56) References Cited

U.S. PATENT DOCUMENTS

2005/0089751 A1* 4/2005 Oogami .............. H01M 2/1061
429/162
2006/0177733 A1* 8/2006 Ha ...................... H01M 2/0212
429/159
(Continued)

FOREIGN PATENT DOCUMENTS

KR 10-2013-0132459 A 12/2013
KR 10-2015-0044599 Y 4/2015
KR 10-2016-0077762 A 7/2016

OTHER PUBLICATIONS

The First Office Action dated Sep. 20, 2019, issued in corresponding Korean Patent Application No. 10-2016-0137723.

*Primary Examiner* — Matthew J Merkling
(74) *Attorney, Agent, or Firm* — Morgan, Lewis & Bockius LLP

(57) ABSTRACT

A battery pack that includes a plurality of battery modules arranged adjacent to each other and mounted on a base plate, the base plate including a module receiving part on which the battery modules are mounted, and a cooling assembly that is disposed between the base plate and bottom portions of the battery modules and through which a refrigerant flows so as to cool the battery modules. In order to couple the battery modules to the base plate, bolt fastening grooves are drilled in the height direction of the battery module at respective corners on the horizontal surface of the battery module, and welding nuts are inserted through openings and fitted to the base plate at positions corresponding to the bolt fastening grooves.

13 Claims, 5 Drawing Sheets

(51) Int. Cl.
*H01M 10/647* (2014.01)
*H01M 10/6556* (2014.01)
*H01M 10/6554* (2014.01)
*H01M 2/20* (2006.01)

(56) References Cited

U.S. PATENT DOCUMENTS

| | | | |
|---|---|---|---|
| 2007/0037052 A1* | 2/2007 | Jeon | H01M 2/1016 |
| | | | 429/152 |
| 2012/0045686 A1* | 2/2012 | Jung | H01M 2/10 |
| | | | 429/159 |
| 2012/0107663 A1 | 5/2012 | Burgers et al. | |
| 2012/0263988 A1* | 10/2012 | Obasih | H01M 10/625 |
| | | | 429/98 |
| 2013/0122339 A1* | 5/2013 | Chae | H01M 10/625 |
| | | | 429/99 |
| 2013/0149571 A1* | 6/2013 | Lee | H01M 2/1077 |
| | | | 429/61 |
| 2015/0255837 A1* | 9/2015 | Larsson | H01M 10/6554 |
| | | | 429/120 |
| 2015/0295283 A1* | 10/2015 | Eom | H01M 10/482 |
| | | | 429/61 |
| 2015/0303415 A1* | 10/2015 | Kayano | H01M 2/206 |
| | | | 429/159 |
| 2016/0056427 A1* | 2/2016 | Kim | H01M 2/1077 |
| | | | 429/90 |
| 2016/0099449 A1* | 4/2016 | Moschet | H01M 2/1077 |
| | | | 429/100 |
| 2016/0099490 A1* | 4/2016 | Larsson | H01M 2/1077 |
| | | | 429/120 |
| 2017/0343615 A1 | 11/2017 | Lee et al. | |
| 2018/0053921 A1* | 2/2018 | Kim | H01M 2/0287 |
| 2018/0138559 A1* | 5/2018 | Omura | H01M 10/625 |

* cited by examiner

BATTERY PACK INCLUDING COUPLING MEMBER HAVING ASSEMBLING GUIDE FUNCTION

CROSS-REFERENCE TO RELATED APPLICATION

This application claims priority to Korean Patent Application No. 2016-0137723 filed on Oct. 21, 2016 and all the benefits accruing therefrom under 35 U.S.C. § 119, the contents of which are incorporated by reference in their entirety.

BACKGROUND

The present disclosure relates to a battery pack including a coupling member having an assembling guide function.

Recently, with the increasing of technical development and demands of mobile devices, demands of rechargeable secondary batteries as energy sources are rapidly increasing, and thus more researches on the secondary batteries are being carried out to cope with such diverse demands. Also, the secondary batteries have attracted considerable attention as power sources for electric vehicles (EVs), hybrid electric vehicles (HEVs), and plug-in hybrid electric vehicles (Plug-In HEVs), which have been proposed as solutions to air pollution and the like caused by existing gasoline and diesel vehicles that use fossil fuels.

Therefore, the electric vehicles (EVs) capable of traveling using only a battery and the hybrid electric vehicles (HEVs) using a battery in combination with an existing engine, have been developed, some of which have been commercialized. For the secondary batteries as power sources for EVs and HEVs, nickel metal hydride (Ni-MH) batteries are commonly used. However, recent researches on using lithium secondary batteries having high energy density, high discharge voltage, and output stability are being actively carried out, some of which have reached the commercialization.

When such secondary batteries are used as a vehicle power source, the secondary batteries are used in the form of a battery pack including a plurality of battery cells, battery modules, or battery module assemblies.

Such a battery pack has a structure in which a plurality of battery modules are mounted on a module receiving part provided in a base plate.

In a process of mounting the battery modules on the base plate by an operator during a battery pack manufacturing process in accordance with related art, because there are no member and structure for guiding positions of the battery modules on the base plate, the battery modules have been frequently dislocated depending on the skills of operators.

Due to an assembly tolerance of the battery module caused by the dislocation, structural strength of an overall battery pack was deteriorated, and an assembly failure occurred.

Thus, there is great need for technologies that may fundamentally solve the above-described limitations.

SUMMARY

The present disclosure provides solutions for the above-described limitations according to the related art and technical tasks requested from the past.

Particularly, the present disclosure provides a battery pack including a welding nut with an improved structure through which battery modules may be guided to the base plate in position and then mounted and coupled to the base plate in a process of mounting the battery modules on the base plate during a battery pack manufacturing process.

In accordance with an exemplary embodiment, a battery pack includes: a plurality of battery modules arranged adjacent to each other and mounted on a base plate; the base plate including a module receiving part on which the battery modules are mounted; and a cooling assembly that is disposed between the base plate and bottom portions of the battery modules, and through which a refrigerant flows so as to cool the battery modules, wherein, in order to couple the battery modules to the base plate, bolt fastening grooves are drilled, in the height direction of the battery module, at respective corners on the horizontal surface of the battery module, and welding nuts are inserted through openings and fitted to the base plate at positions corresponding to the bolt fastening grooves, and the welding nut has an upper end that extends upward in the height direction and is inserted inside the bolt fastening groove, and a bolt is inserted into the bolt fastening groove and the welding nut to couple the battery module and the base plate.

Therefore, the battery pack in accordance with an exemplary embodiment may include the welding nut with an improved structure in which an upper end of the welding nut extends upward in the height direction and is inserted inside the bolt fastening groove, and thus battery modules may be guided to the base plate in position and then mounted and coupled to the base plate in a process of mounting the battery modules on the base plate during a battery pack manufacturing process.

In one exemplary embodiment, the welding nut may include: a nut part which is fitted to the bottom of the base plate and to which a lower end of the bolt is fastened; and a guide part extending upward from the top surface of the nut part in the height direction and inserted into the bolt fastening groove.

As one specific example of the guide part, the guide part may be formed to have a size of 10% to 40% of the height of the bolt fastening groove.

When the guide part is formed to have a size less than 10% of the height of the bolt fastening groove, it may be difficult to allow the base plate to be quickly in position on the base plate. On the other hand, when the guide part is formed to have a size greater than 40% of the height of the bolt fastening groove, it may be not easy to assemble the battery module to the welding nut.

The nut part may have an outer diameter greater than an inner diameter of the opening, and the guide part may have an outer diameter corresponding to the inner diameter of the opening.

In one exemplary embodiment, the battery module may includes: a unit cell array in which a plurality of unit cells are arrayed such that side surfaces of the unit cells are adjacent to each other; a module base plate on which the unit cell array is mounted; bus bar assemblies respectively mounted on the front and rear surfaces of the unit cell array to electrically connect the unit cells to each other; a slave battery management system (BMS) mounted on a surface of any one of the bus bar assemblies and configured to detect a voltage and a temperature from the unit cell array to control the battery module; end plates respectively mounted on outer surfaces of the bus bar assembly and the slave BMS; and a top cover having a structure in which the top cover is mounted on the top surface of the unit cell array and coupled to the module base plate to house the unit cell array therein.

The bolt fastening grooves may be respectively provided at both ends of the end plate. Accordingly, four bolt fastening grooves may be provided at each of the battery module.

Particularity, the bolt fastening groove may have a size of 20% to 70% of the height of the battery module. When the bolt fastening groove has a size less than 20% of the height of the battery module, a bolt with a relatively small size may be inserted, resulting in a weak coupling force between the battery module and the base plate.

On the other hand, when the bolt fastening groove has a size greater than 70% of the height of the battery module, a bolt with a relatively large size may be inserted, thereby increasing a time required in a manufacturing process.

In one exemplary embodiment, the unit cell may have a structure in which plate-shaped battery cells are mounted by two units on a cartridge in which a battery cell receiving part is provided.

In one exemplary embodiment, the cooling assembly may include: a heat transfer plate mounted on the bottom end of the battery module; and an assembly cooling plate which is mounted while being in thermal contact with the bottom surface of the heat transfer plate and includes a hollow structure or a refrigerant conduit through which a refrigerant flows.

In one exemplary embodiment, the battery cell may be formed of a pouch-type battery cell.

The pouch-type battery cell may have a structure in which an electrode assembly, in conjunction with an electrolyte, is contained and sealed in a battery case including a receiving part, the electrode assembly being provided with a negative electrode, a positive electrode, and a separator interposed between the negative electrode and the positive electrode.

The electrode assembly may be configured from a folding-type structure, a stack-type structure, a stack/folding-type structure, or a lamination/stack-type structure.

The electrode structures of the folding-type, the stack-type, and the lamination/stack-type will be described as follows.

First, a unit cell with the folding-type structure may be manufactured by: applying an electrode mixture including an electrode active material onto each of metallic current collectors; disposing a separator sheet between positive and negative electrodes that are dried and pressed in sheet shapes; and then winding the resultant.

Also, a unit cell with the stack-type structure may be manufactured by: applying an electrode mixture onto each of metallic current collectors; then performing drying and pressing processes; cutting positive and negative electrode plates into predetermined sizes; interposing a separator, which is cut into a predetermined size corresponding to the positive and negative electrode plates, between the positive and negative electrode plates; and then stacking the resultant.

In addition, a unit cell with the stack/folding-type structure may have a structure in which a positive electrode faces a negative electrode, and may include two or more unitary cells in which two or more electrode plates are staked, the unit cell being manufactured by winding the unitary cells with one or more separating film in a non-overlapping configuration, or by bending a separating film at a size of the unitary cell and interposing the separating film between the unitary cells.

In some cases, one or more single electrode plate may be further included between any of the unitary cells and/or on an outer surface of the outermost unitary cell, while having a structure in which positive and negative electrodes face each other.

The unitary cell may be an S-type unitary cell in which the outermost electrode plates at both sides have the same polarity and a D-type unitary cell in which the outermost electrode plates at both sides have different polarities.

The S-type unitary cell may have a SC-type unitary cell in which the outermost electrode plates at both sides have positive polarities and a SA-type unitary cell in which the outermost electrode plates at both sides have negative polarities.

Also, a unit cell with the lamination/stack-type structure may be manufactured by: applying an electrode mixture onto each of metallic current collectors; then performing drying and pressing processes; and cutting the resultant into a predetermined size and laminating, successively from the bottom, a negative electrode, a separator above the negative electrode, a positive electrode, and a separator above the positive electrode.

The battery case may be made of a pouch-type battery case with a laminate structure including a metal layer and a resin layer.

As one specific example of the battery case, the battery case may be configured from a laminate sheet including a resin outer layer with excellent durability, a metal layer with barrier properties, and a resin sealant layer with thermofusible properties. The resin sealant layer may be thermally fused mutually.

Since the resin outer layer should have excellent resistance against external environment, the resin outer layer needs to have tensile strength and weatherability higher than a predetermined level. To this end, a polyethylene terephthalate (PET) and an elongated nylon film may be preferably used as a polymer resin of the outer resin layer.

The metal layer with barrier properties may be preferably made of aluminum in order to exert not only the function of preventing introduction or leakage of foreign substances such as gas and moisture, but also the function of improving the strength of the battery case.

The resin sealant layer may be preferably made of a polyolefin-based resin, which has a thermofusible (heat-bondable) property, a low hygroscopic property to suppress permeation of an electrolyte, and prevents expansion or corrosion caused by the electrolyte. More preferably, the resin sealant layer may be made of non-elongated polypropylene (e.g. cast polypropylene; CPP).

In one specific example, although a type of the battery cell is not particularly limited, a specific example of the batter cell may be a lithium secondary battery such as a lithium ion battery and a lithium ion polymer battery having high energy density, high discharge voltage, and output stability.

Generally, the lithium secondary battery may include a positive electrode, a negative electrode, a separator, and a non-aqueous electrolyte containing a lithium salt.

The positive electrode is manufactured, for example, by applying a mixture of a positive electrode active material, a conductive material, and a binder onto a positive electrode current collector and then drying the resultant, and if necessary, a filler may be further added to the mixture.

Examples of the positive electrode active material may include: a layered compound such as a lithium cobalt oxide ($LiCoO_2$) and a lithium nickel oxide ($LiNiO_2$), or a compound substituted with one or more transition metals; a lithium manganese oxide such as $Li_{1+x}Mn_{2-x}O_4$ (where, x=0-0.33), $LiMnO_3$, $LiMn_2O_3$, and $LiMnO_2$; a lithium copper oxide ($Li_2CuO_2$); a vanadium oxide such as $LiV_3O_8$, $LiFe_3O_4$, $V_2O_5$, and $Cu_2V_2O_7$; a Ni-site type lithium nickel oxide expressed by a chemical formula $LiNi_{1-x}M_xO_2$ (where M=Co, Mn, Al, Cu, Fe, Mg, B, or Ga, and x=0.01-0.3); a lithium manganese composite oxide expressed by a chemical formula $LiMn_{2-x}M_xO_2$ (where M=Co, Ni, Fe, Cr, Zn, or Ta, and x=0.01-0.1) or a chemical formula $Li_2Mn_3MO_8$ (M=Fe, Co, Ni, Cu, or Zn); $LiMn_2O_4$ where a portion of the Li of the chemical formula is substituted with alkaline earth metal ions; a disulfide compound; and $Fe_2(MoO_4)_3$, but not limited thereto.

Generally, the conductive material is added at 1 wt % to 30 wt % on the basis of the total weight of the mixture including the positive active material. The conductive material is not particularly limited as long as it has electrical conductivity without causing a chemical change in the corresponding battery. For example, the conductive material may include: graphite such as natural graphite and artificial graphite; carbon black such as carbon black, acetylene black, Ketjen black, channel black, furnace black, lamp black, and thermal black; a conductive fiber such as a carbon fiber and a metal fiber; metal powder such as fluorocarbon, aluminum, and nickel powder; a conductive whisker such as a zinc oxide and potassium titanate; a conductive metal oxide such as a titanium oxide; and a conductive material such as a polyphenylene derivative.

The binder is a substance that assists in binding of the active material and the conductive material and binding to the current collector, and generally added at 1 wt % to 30 wt % on the basis of the total weight of the mixture including the positive electrode active material. For example, the binder may include: polyfluorovinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene-terpolymer (EPDM), sulfonated EPDM, stylene butylene rubber, fluoro rubber, and various copolymers.

The filler is selectively used as a substance for suppressing expansion of the positive electrode, and is not particularly limited as long as it is a fibrous material without causing a chemical change in the corresponding battery. For example, the filler includes: an olefin-based copolymer such as polyethylene and polypropylene; and a fibrous material such as a glass fiber and a carbon fiber.

The negative electrode is manufactured by applying a negative electrode active material onto a negative electrode current collector and then drying the resultant, and if necessary, substances described above may be further selectively included.

For example, the negative electrode active material may include: carbon such as non-graphitized carbon and graphitized carbon; a metal composite oxide such as $Li_xFe_2O_3$ ($0 \le x \le 1$), $Li_xWO_2$ ($0 \le x \le 1$), and $Sn_xMe_{1-x}Me'_yO_z$ (Me: Mn, Fe, Pb, Ge; Me': Al, B, P, Si, Group I, II and III elements of the Periodic Table, halogen atoms; $0 < x \le 1$; $1 \le y \le 3$; and $1 \le z \le 8$); a lithium metal; a lithium alloy; a silicon-based alloys; a tin-based alloy; a metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; a conductive polymer such as polyacetylene; and a Li—Co—Ni based material.

The separator and a separating film are interposed between the positive electrode and the negative electrode, and an insulating thin film having high ion permeability and mechanical strength is used as the separator and the separating film. The separator typically has a pore diameter of 0.01 to 10 µm and a thickness of 5 to 130 µm. For example, the separator includes: an olefin-based polymer such as polypropylene that has chemical resistance and hydrophobicity; and a sheet or a non-woven fabric formed of a glass fiber and polyethylene. When a solid electrolyte such as a polymer is used as the electrolyte, the solid electrolyte may serve as the separator.

In addition, as one specific example, the separator and/or the separating film may be an organic/inorganic composite porous safety-reinforcing separator (SRS) in order to improve the safety of the battery.

The SRS separator is manufactured by using inorganic particles and a binder polymer, as active layer substances, on a polyolefin-based separator base material. In this case, the SRS separator has not only a porous structure included in the separator base material itself but also a uniform porous structure provided by means of empty spaces (interstitial volumes) between the inorganic particles that are active layer substances.

In the case of using the organic/inorganic composite porous separator, it is possible to suppress an increase in the thickness of the battery due to swelling during a formation process, when compared to using a general separator. In addition, in the case of using a polymer, which is gellable when impregnated in a liquid electrolyte, as a binder polymer substance, the separator may also be used as an electrolyte at the same time.

Also, since the organic/inorganic composite porous separator is able to exhibit excellent adhesion properties by adjusting contents between the binder polymer and the inorganic particles that are substances of the active layer substances within the separator, an assembling process may be easily performed.

The inorganic particles are not specially limited as long as they are electrochemically stable. That is, the inorganic particles that may be used in the present disclosure are not specially limited as long as an oxidation and/or a reduction reaction are/is not generated within an operating voltage range (for example, 0-5 V with respect to Li/Li+) of the applied battery. Particularly, in the case of using inorganic particles having an ability to transfer ions, a performance may be enhanced by increasing ionic conductivity within an electric chemical device. Therefore, it may be preferable that the ionic conductivity is as high as possible. Also, when the inorganic particles have a high density, it is difficult to disperse them during a coating process, and a weight increases when a battery is manufactured. Therefore, it may be preferable that the density is as low as possible. Also, in the case that the inorganic substance has high permittivity, the ionic conductivity of the electrolyte may be enhanced by contributing to increase a dissociation rate of an electrolyte salt such as a lithium salt in the liquid electrolyte.

The non-aqueous electrolyte containing the lithium salt includes a polar organic electrolyte and the lithium salt. As the electrolyte, a non-aqueous liquid electrolyte, an organic solid electrolyte, and an inorganic solid electrolyte are used.

For example, the non-aqueous electrolyte may include an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric acid tri-ester, trimethoxy methane, a dioxolane derivative, sulfolan, methyl sulfolan, 1,3-dimethyl-2-imidazolidinone, a propylene carbonate derivative, a tetrahydrofuran derivative, ether, methyl propionate, and ethyl propionate.

For example, the organic solid electrolyte may include a polyethylene derivative, a polyethylene oxide derivative, a polypropylene oxide derivative, a phosphoric acid ester polymer, poly agitation lysine, polyester sulfide, polyvinyl alcohol, poly vinylidene fluoride, and a polymer including an ionic dissociation group.

For example, the inorganic solid electrolyte may include a nitride, a halide, and a sulfate of the lithium, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

For example, the lithium salt may include a material easily dissolved in the non-aqueous electrolyte, such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lithium lower aliphatic carbonate, lithium 4-phenyl borate, imide, and the like.

Also, for example, the non-aqueous electrolyte may include pyridine, triethyl phosphite, triethanolamine, cyclic ether, ethylenediamine, n-glyme, hexaphosphoric triamide, a nitrobenzene derivative, sulfur, a quinone-imine dye, N-substituted oxazolidinone, N,N-substituted imidazolidine, ethylene glycol dialkyl ether, an ammonium salt, pyrrole, 2-methoxyethanol, and aluminum trichloride, which are added to the non-aqueous electrolyte in order to improve discharge and charge characteristics and flame retardancy. In some cases, a halogen-containing solvent such as carbon tetrachloride and ethylene trifluoride may be further included so as to provide non-combustibility, and a carbon dioxide gas may be further included so as to improve high-temperature storage characteristics.

In one exemplary embodiment, although the battery modules are connected to each other in series, they may be connected to each other in series and/or in parallel according to the desired battery specification.

In addition, the present disclosure may provide a device including the battery pack as a power source.

The device may be a device selected from electric vehicles, hybrid electric vehicles, plug-in hybrid electric vehicles, and power storage devices.

Since structures and manufacturing methods thereof are well known in the art, detail descriptions thereof will be omitted in this disclosure.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, although the present disclosure is further described with reference to the drawings in accordance with exemplary embodiments, the scope of the present disclosure is not limited thereto.

Figure 1:
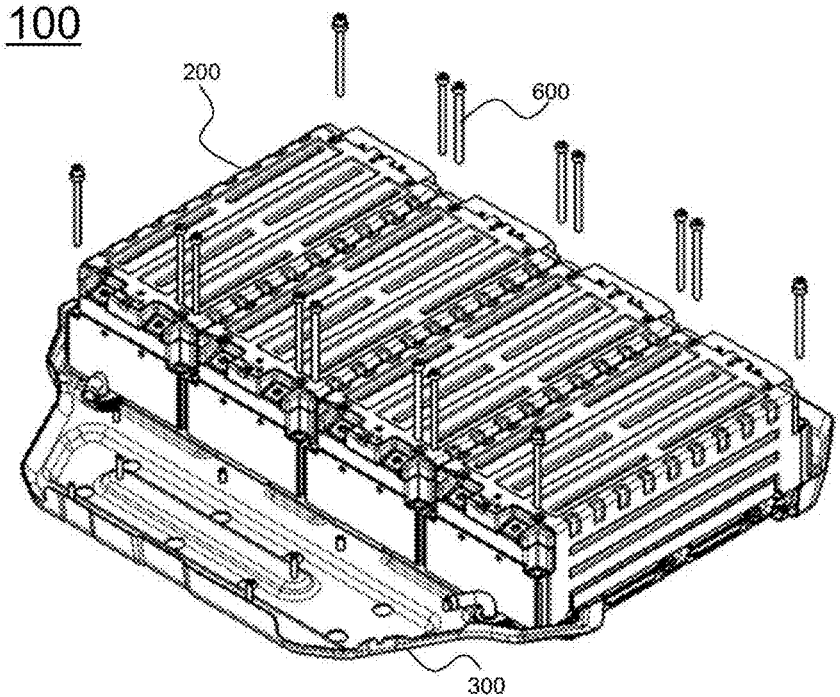
FIG. 1 is a perspective view of a battery pack in accordance with an exemplary embodiment.
Figure 2:
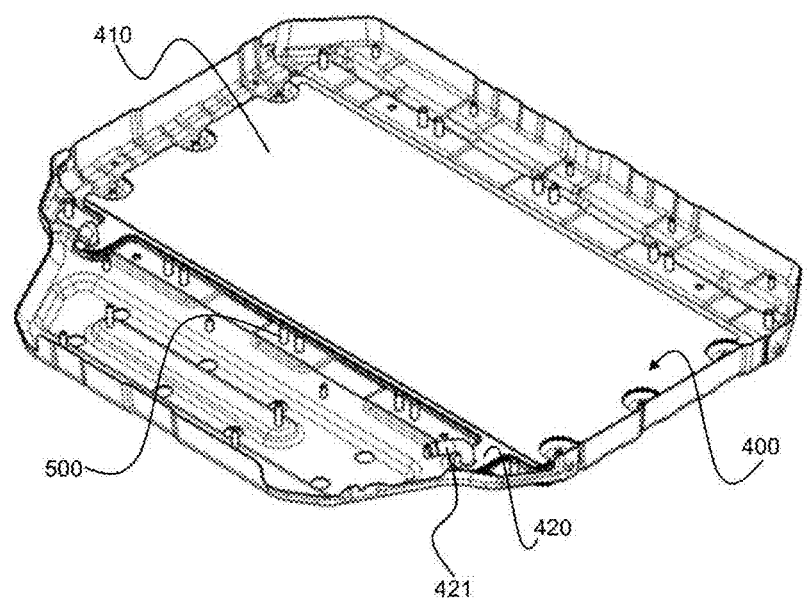
FIG. 2 is a perspective view of a base plate and a cooling assembly of the battery pack of FIG. 1.
Figure 3:
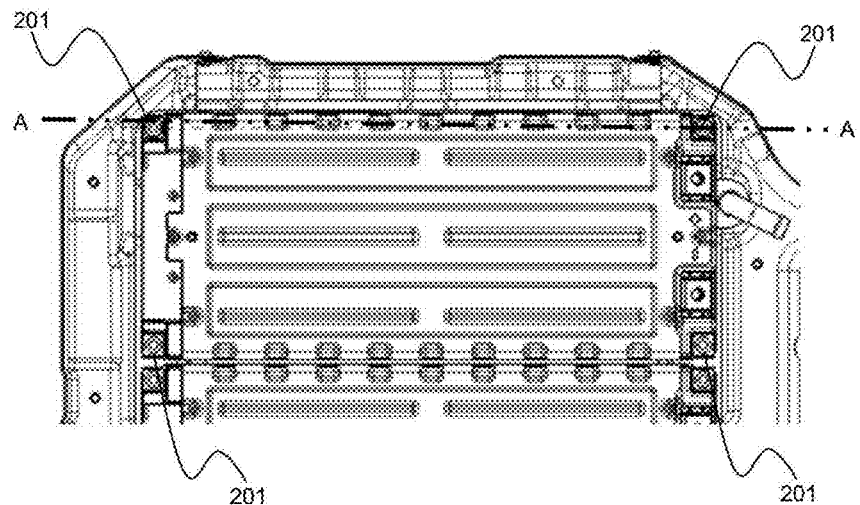
FIG. 3 is a top view of the battery pack of FIG. 1.
Figure 4:
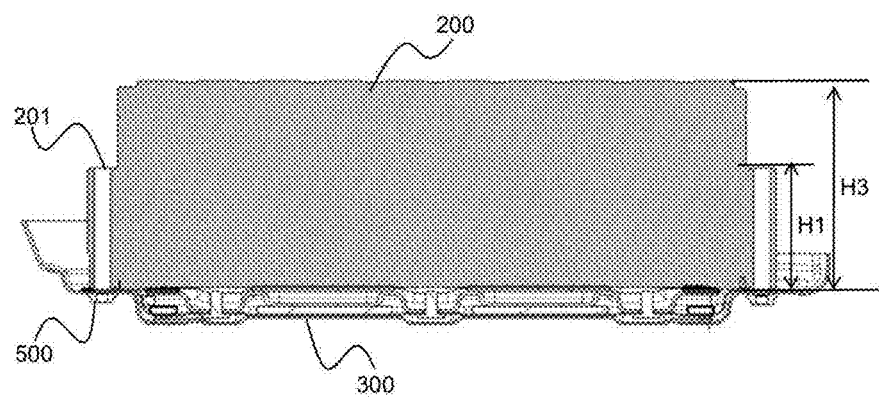
FIG. 4 is a vertical cross-sectional view, taken along line 'A-A' of FIG. 3.
Figure 5:
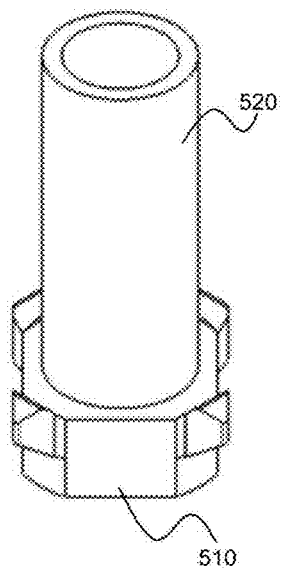
FIG. 5 is a perspective view of a welding nut of FIG. 2.
Figure 6:
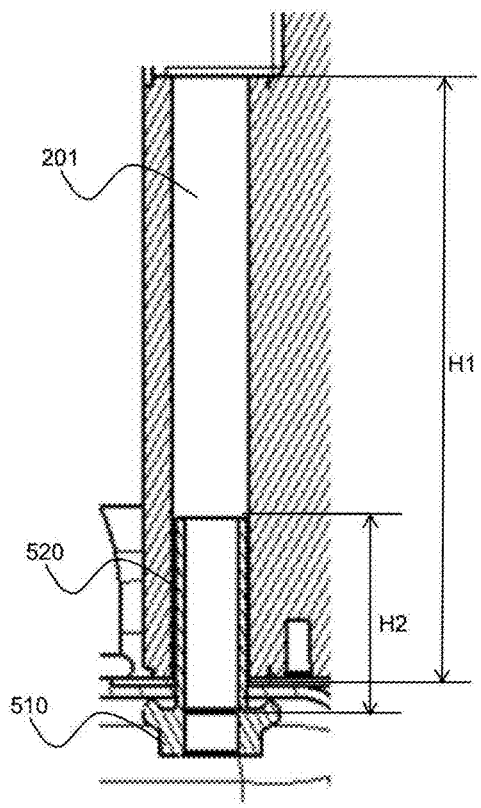
FIG. 6 is a vertical cross-sectional view illustrating a state in which the welding nut of FIG. 5 is inserted into a bolt fastening groove.
Figure 7:
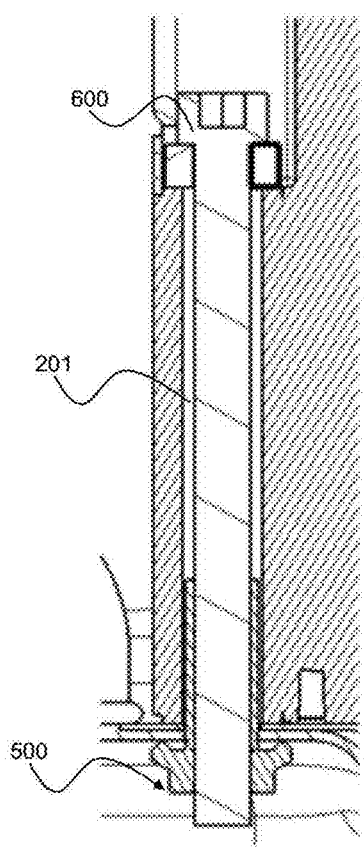
FIG. 7 is a vertical cross-sectional view illustrating a state in which a bolt is inserted into the bolt fastening groove and the welding nut of FIG. 6.

FIG. 1 illustrates a perspective view of a battery pack in accordance with an exemplary embodiment; FIG. 2 illustrates a perspective view of a base plate and a cooling assembly of the battery pack of FIG. 1; FIG. 3 illustrates a top view of the battery pack of FIG. 1; FIG. 4 illustrates a vertical cross-sectional view, taken along line 'A-A' of FIG. 3; FIG. 5 illustrates a perspective view of a welding nut of FIG. 2; FIG. 6 illustrates a vertical cross-sectional view showing a state in which the welding nut of FIG. 5 is inserted into a bolt fastening groove; and FIG. 7 illustrates a vertical cross-sectional view showing a state in which a bolt is inserted into the bolt fastening groove and the welding nut of FIG. 6.

Referring to FIGS. 1 to 7, a battery pack 100 includes a plurality of battery modules 200, a base plate 300, a cooling assembly 400, a welding nut 500, and a bolt 600.

The battery modules 200 are mounted on a module receiving part 310 disposed in the base plate 300, and the battery modules 200 are connected to each other in series.

The cooling assembly 400 is disposed between the base plate 300 and bottom portions of the battery modules 200 so as to cool the battery modules 200. The cooling assembly 400 includes a heat transfer plate 410 mounted on the bottom ends of the battery modules 200, and an assembly cooling plate 420 which is mounted while being in thermal contact with the bottom surface of the heat transfer plate 410 and includes a refrigerant conduit 421 through which a refrigerant flows.

In order to couple the battery modules 200 to the base plate 300, bolt fastening grooves 201 are drilled, in the height direction of the battery module, at respective corners on the horizontal surface of the battery module 200. Also, welding nuts 500 are inserted through openings and fitted to the base plate 300 at positions corresponding to the bolt fastening grooves 201.

The welding nut 500 has an upper end that extends upward in the height direction and is inserted inside the bolt fastening groove 201, and the bolt 600 is inserted into the bolt fastening groove 201 and the welding nut 500 to couple the battery module 200 and the base plate 300.

In particular, the welding nut 500 includes a nut part 510 and a guide part 520.

The nut part 510 is fitted to the bottom of the base plate 300, and a lower end of the bolt 600 is fastened to the nut part 510. The guide part 520 extends upward from the top surface of the nut part 510 in the height direction, and is inserted into the bolt fastening groove 201.

The height (H2) of the guide part 520 is 40% of the height (H1) of the bolt fastening groove 201.

The nut part 510 has an outer diameter greater than an inner diameter of the opening, and the guide part 520 has an outer diameter corresponding to the inner diameter of the opening.

Figure 8:
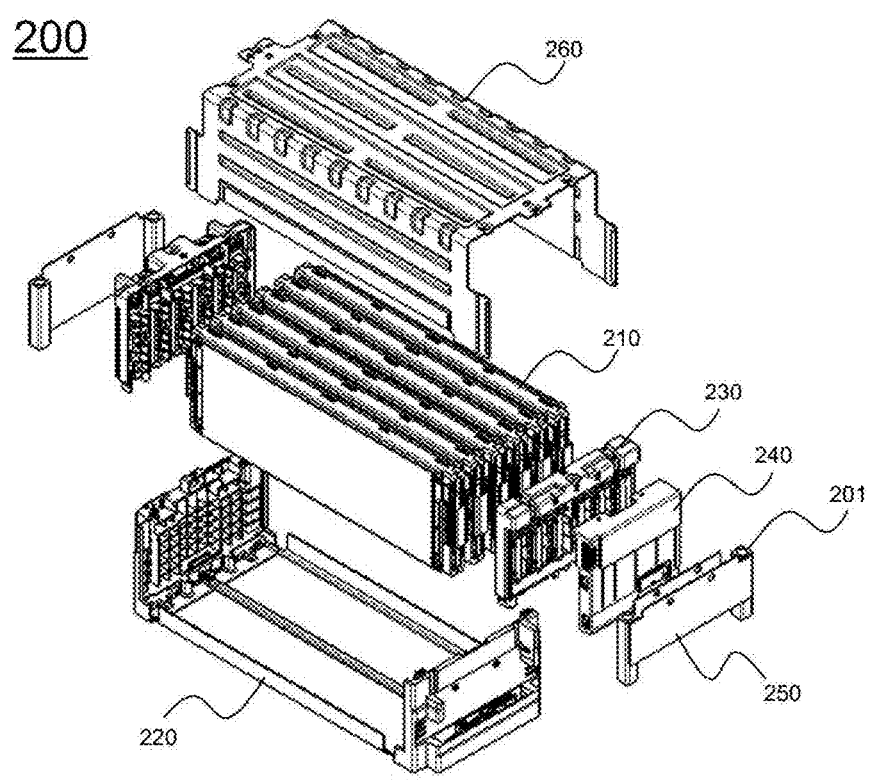
FIG. 8 is an exploded view of the battery module of FIG. 1.

FIG. 8 illustrates an exploded view of the battery module of FIG. 1.

Referring to FIG. 8 in conjunction with FIG. 4, the battery module 200 includes a unit cell array 210, a module base plate 220, a bus bar assembly 230, a slave BMS 240, an end plate 250, and a top cover 260.

The unit cell array 210 has a structure in which a plurality of unit cells 211 are arrayed such that their side surfaces are adjacent to each other, and the unit cell array 210 is mounted on the module base plate 220.

The bus bar assemblies 230 are respectively mounted on the front and rear surfaces of the unit cell array 210 to electrically connect the unit cells to each other.

The slave BMS 240 is mounted on one surface of the bus bar assembly 230, and detects a voltage and a temperature from the unit cell array 210 to control the battery module 200.

The end plates 250 are respectively mounted on outer surfaces of the bus bar assembly 230 and the slave BMS 240.

The top cover 260 has a structure in which the top cover 260 is mounted on the top surface of the unit cell array 210 and coupled to the module base plate 220 to house the unit cell array 210 therein.

The bolt fastening grooves 201 are respectively provided at both ends of the end plate 250, and the height (H1) of the bolt fastening groove 201 is 60% of the height (H3) of the battery module 200.

As described above, the battery pack in accordance with an exemplary embodiment may include the welding nut with an improved structure in which an upper end of the welding nut extends upward in the height direction and is inserted inside the bolt fastening groove, and thus battery modules may be guided to the base plate in position and then mounted and coupled to the base plate in the process of mounting the battery modules on the base plate during the battery pack manufacturing process.

It will be apparent by those skilled in the art that various applications and modifications can be made thereto, on the basis of the above-descriptions, within the scope of the present disclosure.

What is claimed is:

1. A battery pack comprising:
   a plurality of battery modules arranged adjacent to each other and mounted on a base plate;
   the base plate comprising a module receiving part on which the battery modules are mounted; and
   a cooling assembly that is disposed between the base plate and bottom portions of the battery modules, and through which a refrigerant flows so as to cool the battery modules,
   wherein, in order to couple the battery modules to the base plate, bolt fastening grooves are drilled, in the height direction of the battery module, at respective corners on the horizontal surface of the battery module, and welding nuts are inserted through openings and fitted to the base plate at positions corresponding to the bolt fastening grooves, and
   the welding nut has an upper end that extends upward in the height direction and is inserted inside the bolt fastening groove, and a bolt is inserted into the bolt fastening groove and the welding nut to couple the battery module and the base plate.

2. The battery pack of claim 1, wherein the welding nut comprises: a nut part which is fitted to the bottom of the base plate and to which a lower end of the bolt is fastened, and
   a guide part extending upward from the top surface of the nut part in the height direction and inserted into the bolt fastening groove.

3. The battery pack of claim 2, wherein the guide part is formed to have a size of 10% to 40% of the height of the bolt fastening groove.

4. The battery pack of claim 2, wherein the nut part has an outer diameter greater than an inner diameter of the opening, and the guide part has an outer diameter corresponding to the inner diameter of the opening.

5. The battery pack of claim 1, wherein the battery module comprises:
   a unit cell array in which a plurality of unit cells are arrayed such that side surfaces of the unit cells are adjacent to each other;
   a module base plate on which the unit cell array is mounted;
   bus bar assemblies respectively mounted on the front and rear surfaces of the unit cell array to electrically connect the unit cells to each other;
   a slave battery management system (BMS) mounted on a surface of any one of the bus bar assemblies and configured to detect a voltage and a temperature from the unit cell array to control the battery module;
   end plates respectively mounted on outer surfaces of the bus bar assembly and the slave BMS; and
   a top cover having a structure in which the top cover is mounted on the top surface of the unit cell array and coupled to the module base plate to house the unit cell array therein.

6. The battery pack of claim 5, wherein the bolt fastening grooves are respectively provided at both ends of the end plate.

7. The battery pack of claim 6, wherein the bolt fastening groove has a size of 20% to 70% of the height of the battery module.

8. The battery pack of claim 5, wherein the unit cell has a structure in which plate-shaped battery cells are mounted by two units on a cartridge in which a battery cell receiving part is provided.

9. The battery pack of claim 1, wherein the cooling assembly comprises:
   a heat transfer plate mounted on the bottom end of the battery module; and
   an assembly cooling plate which is mounted while being in thermal contact with the bottom surface of the heat transfer plate and comprises a hollow structure or a refrigerant conduit through which a refrigerant flows.

10. The battery pack of claim 8, wherein the battery cell is a pouch-type battery cell.

11. The battery pack of claim 10, wherein the pouch-type battery cell has a structure in which an electrode assembly, in conjunction with an electrolyte, is contained and sealed in a battery case made of a laminate sheet, the electrode assembly being provided with a negative electrode, a positive electrode, and a separator interposed between the negative electrode and the positive electrode.

12. The battery pack of claim 1, wherein the battery modules are connected to each other in series.

13. A device comprising the battery pack in accordance with 1, as a power source.

* * * * *